Aug. 2, 1938.  S. F. MONROE  2,125,388
PHOTOGRAPHING APPARATUS
Filed Dec. 7, 1936   3 Sheets-Sheet 1
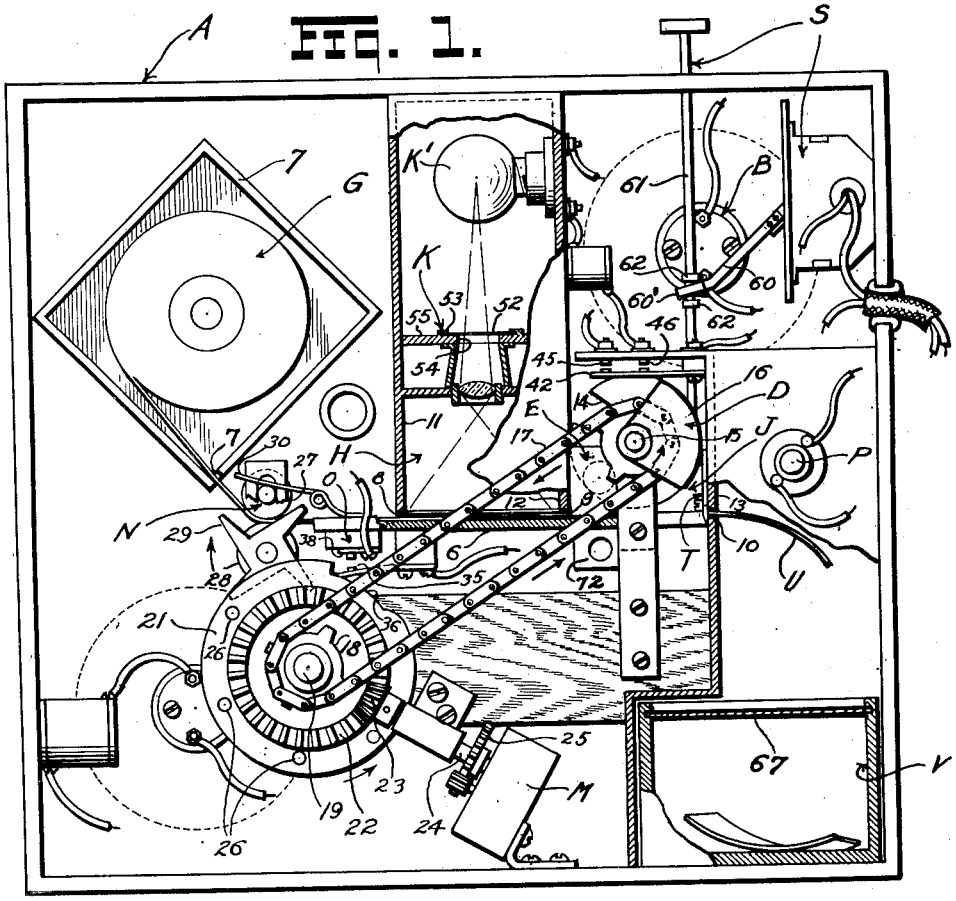
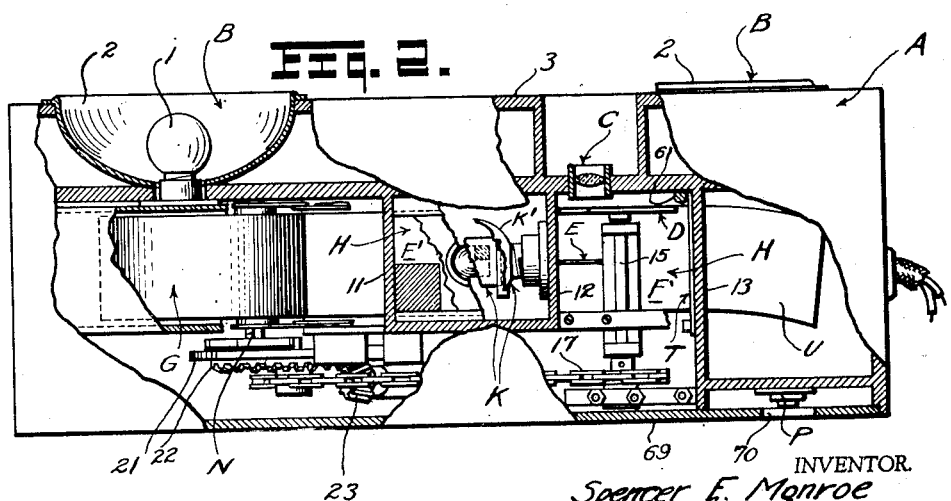
INVENTOR.
Spencer F. Monroe
BY
ATTORNEY.

Aug. 2, 1938.     S. F. MONROE     2,125,388
PHOTOGRAPHING APPARATUS
Filed Dec. 7, 1936     3 Sheets-Sheet 2
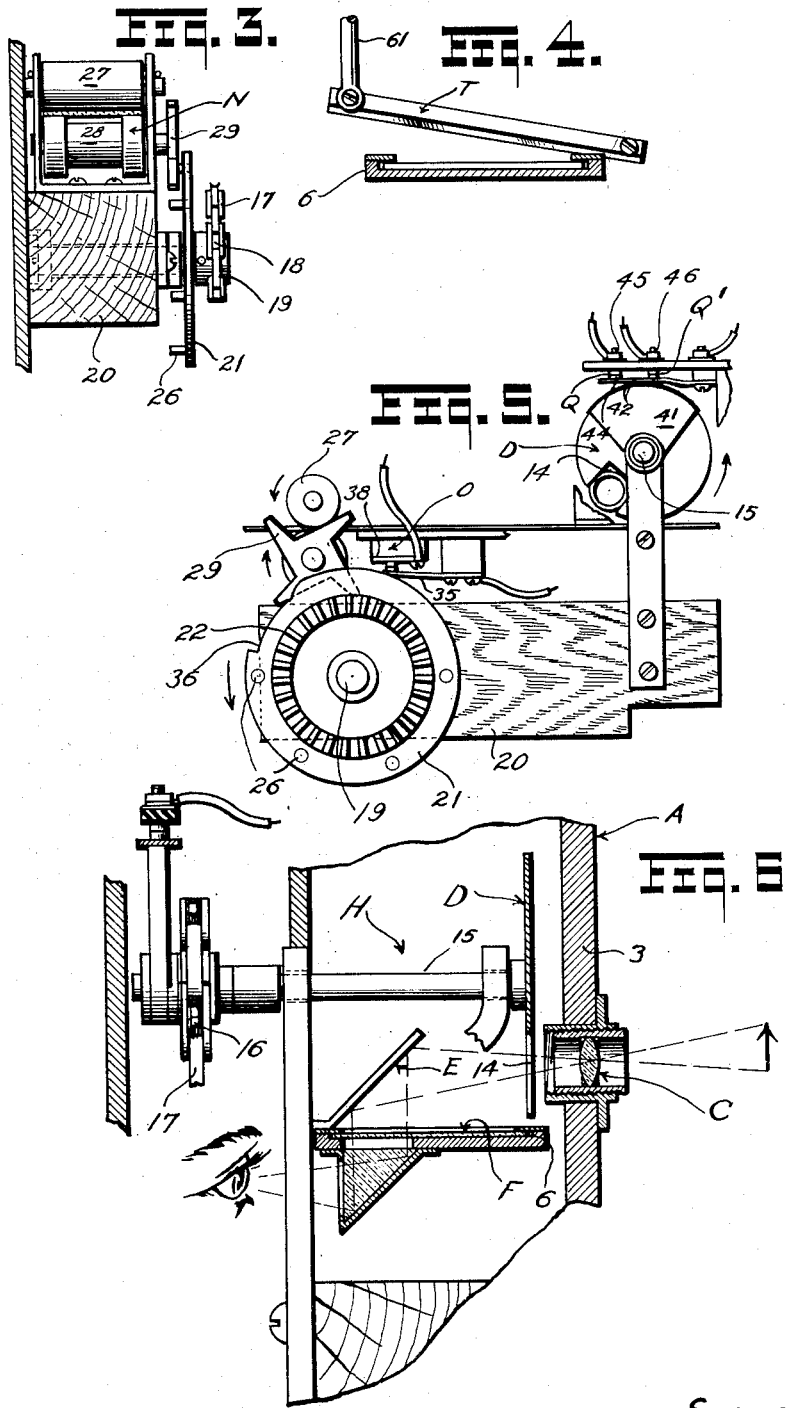
INVENTOR.
Spencer F. Monroe
BY
ATTORNEY.

Aug. 2, 1938.     S. F. MONROE     2,125,388
PHOTOGRAPHING APPARATUS
Filed Dec. 7, 1936     3 Sheets-Sheet 3
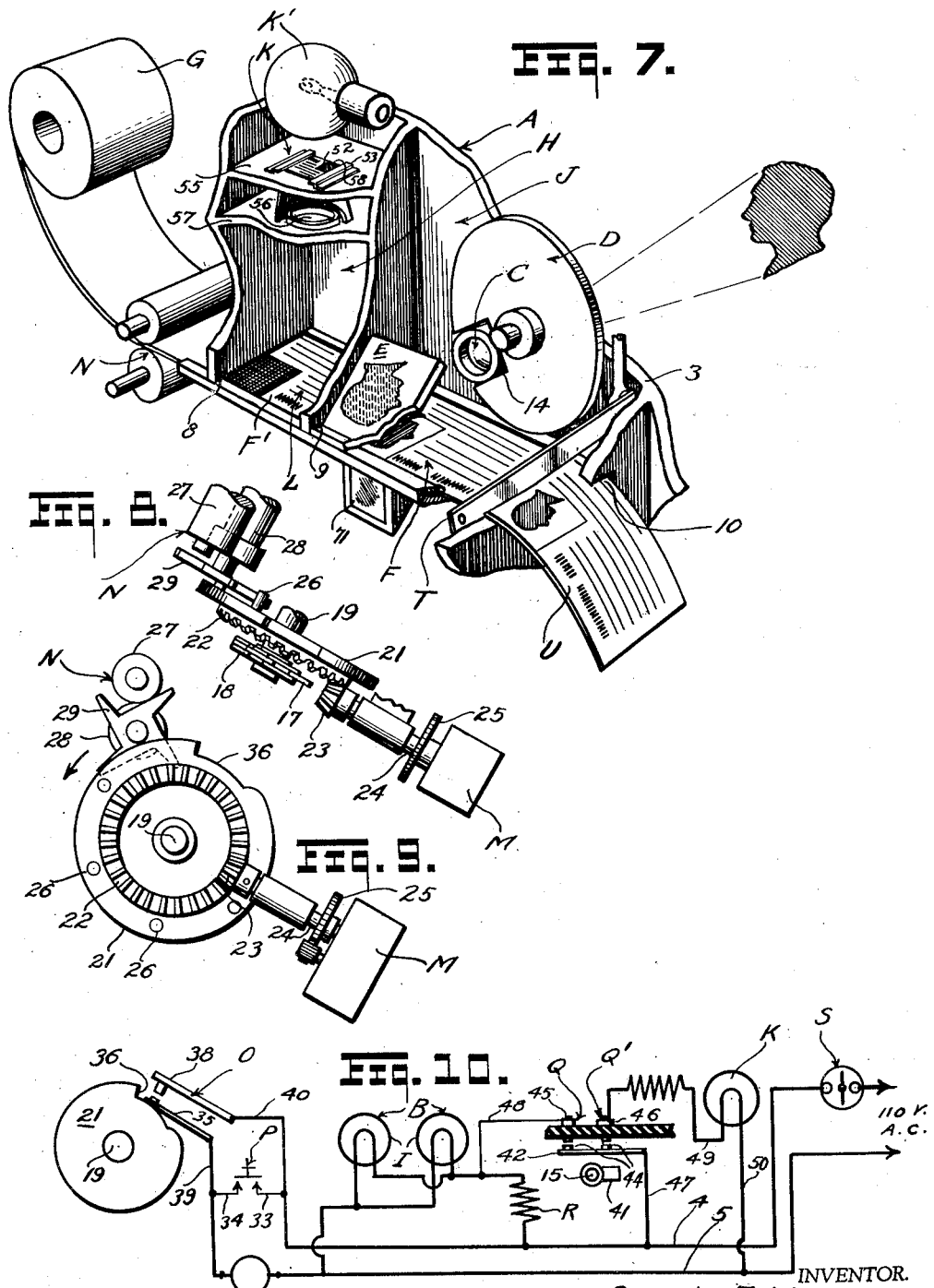
INVENTOR.
Spencer F. Monroe
BY
ATTORNEY.

Patented Aug. 2, 1938

2,125,388

UNITED STATES PATENT OFFICE 2,125,388

PHOTOGRAPHING APPARATUS

Spencer F. Monroe, Colton, Calif., assignor to J. Earl Peterson, Hamilton, Ohio

Application December 7, 1936, Serial No. 114,554

14 Claims. (Cl. 95—1.1)

This invention relates to and has for an object the provision of a novel and particularly efficacious camera which may be rapidly operated to produce, in a comparatively short time and at a low cost, a large number of positive and legally sound identifying photographs on license cards for vehicle driving, passports, and other documents and instrument without necessitating the making of negatives and the printing of positive pictures therefrom.

Another object is to provide photographic apparatus of the character described, which will produce composite positive photographs, such, for example, as ruled lines and captions, as found on license and other identifying cards, etc., together with an identifying photograph of the particular person to which the card is to be issued, or may be operated to make a positive, composite photographic reproduction of any two or more subjects, as desired.

A further object of this invention is to provide a photographic camera, including a plurality of independent photographing chambers, means for advancing a strip of sensitized material from one to the other of said chambers, and means for making photographic records on portions of the strips of sensitized material contained in said chambers, whereby to facilitate the making of composite photographs in a particularly efficacious manner.

I have shown in the accompanying drawings a preferred form of photographing apparatus embodying my invention, subject, however, to modification, within the scope of the appended claims, without departing from the spirit of my invention.

Referring to the drawings:

Fig. 1 is a rear elevation of the camera of this invention with the back of the housing removed and certain parts broken away and others in section for the sake of clarity of illustration;

Fig. 2 is a fragmentary top plan view of the camera with parts in section;

Fig. 3 is an end view of the sensitized paper feed mechanism;

Fig. 4 is an enlarged sectional view of the knife for cutting of the exposed portion of the paper;

Fig. 5 is an enlarged side elevation of the feed mechanism and also the automatic circuit closing means;

Fig. 6 is an enlarged fragmentary vertical section showing the arrangement of the lens, image, reversing member, finder and shutter.

Fig. 7 is an enlarged fragmentary perspective view, of schematic arrangement to show the method of making positive composite pictures on a strip of sensitized paper;

Fig. 8 is a side elevation of the motor operated drive means and paper feed means;

Fig. 9 is a front elevation of the means shown in Fig. 8;

Fig. 10 is a diagram of the electrical circuits employed in the camera.

The photographic apparatus shown in the accompanying drawings exemplifies one embodiment of my invention and generally comprises a camera consisting of a housing A, lighting means B for illuminating the subject of photography, a lens C, a shutter D, a mirror or like means E for reversing the image and reflecting same onto the portion F of a strip of sensitized paper extended from a roll G, and photographic chambers H and J through which the paper strip is fed. The housing also contains means K for photographing on the paper strip F' in the chamber H the positive image, as at L, of an object or subject which is to form a part of the finished photographic product, a motor M, motor operated feed means N for advancing the sensitized paper, and a motor operated circuit closing means O which maintains the motor in operation for a predetermined length of time following the manual closing of push button switch P. Another motor actuated circuit closing means Q operates to short out a resistance unit R and thereby intensifies the illumination effect of the lighting means B when the shutter D is opened, and a similar circuit closing means Q' operates to close the circuit for the lamp K' of means K. The lighting means B is initially operated at low intensity by reason of the resistance element R, upon the closing of manually operable switch means S available for operation at the top of the housing A. The switch means S is connected with a knife T whereby the operation of said means to open said switch will cause said knife to sever from the strip of sensitized paper the extended and photographically exposed portion U, which latter will then drop into the removable container V.

The lighting means B includes suitable incandescent lamps 1 mounted in reflectors 2 countersunk in the front wall 3 of the housing A. These lamps are connected with a source of electrical energy not shown by a circuit, including conductors 4 and 5, and having the switch S, resistance element R, and said lamps in series therein.

The lens C is mounted in the front wall 3 of the housing and extends in the chamber J opposite the mirror E whereby the image will be reflected downwardly onto the strip F supported by a grooved track 6 which forms the bottom of chambers H and J. The sensitized paper roll G is supported in a light-proof housing 7 and extends therefrom through a slot 7' to the feed means N and from thence onto the track 6, there being slots 8, 9, and 10 in the walls 11, 12 and 13 of the chambers H and J, whereby the paper may be fed into and through said chambers.

It will now be apparent that when the shutter D is opened, as will be hereinafter described, the reversed image of the subject of photography will be directed by the lens C onto the mirror E, which latter will again reverse the image and reflect the same onto the strip F of sensitized paper whereby to produce a positive photographic record thereon.

As here provided, the mirror E is comparatively small and arranged so that it will cause the image to be reflected onto a portion only, for example, one corner of the area of the strip F exposed within the chamber J. However, mirrors of different sizes and arrangement may be used whereby to photographically record the image on all or any part of the strip F, as desired. The present arrangement providing for the making of the photographic record on a portion only of the strip F makes possible the making of composite pictures in that the means K may be operated to photograph a subject on part of the strip in the chamber H, while the other part is unexposed, and when said strip is advanced into chamber J the equipment therein may be operated, as hereinbefore described, to photograph the image of the desired subject on said unexposed portion of said strip.

The shutter D is timed so that it will open when the strip F is stationary and comprises a circular disk having a recess or notch 14 adapted to move into and out of registration with the lens C. The shutter is fixed on and for rotation with a shaft 15 journalled on chamber J. Fixed on this shaft is a sprocket wheel 16 operated by a chain 17, in turn driven by a sprocket 18. The sprocket 18 is mounted on a shaft 19, journalled in a support 20. Fixed on shaft 19 is a cam 21 to one face of which is fixed a bevelled ring gear 22 driven by a pinion 23 on shaft 24. The shaft 24 is driven by a motor M through reduction gears 25. The cam 21 is provided with spaced pins or abutments 26 on the face thereof opposite the gear 22 whereby to operate the feed means N.

The feed means N comprises suitably journalled coacting friction feed rollers 27 and 28 of which the latter is provided with a star wheel 29 adapted to be engaged and driven by pins 26 on the cam 21. The pins 26 are arranged in an arcuate series and in such manner that they will engage and operate the star wheel 29 during but a part, for example one-half, of each complete revolution of the cam. During this period of rotation of the cam, the rollers 27 and 28 will operate to advance the sensitized paper along the track 6, so that with the paper initially advanced to the point of entering the slot 8 of chamber H, said paper will be extended onto the chambers H and J and provide the portions F and F' ready for exposure. The roller 27 is tensioned by the spring means 30 whereby to insure frictional feeding of the paper strip when the roller 28 is operated, as aforesaid.

During the other half of each revolution of the cam, the shutter D is operated to open and the various switches are controlled, as will now be explained.

It will be noted that normally the cam 21 is positioned as shown in Fig. 1, this being the position it would assume if stopped, after completing a feeding operation of the paper, as aforesaid. At this time, the shutter D is in position shown in Fig. 1 ready to be moved by the chain and sprocket drive means into open position upon continuation of the rotation of the cam. In other words, the apparatus as shown in Fig. 1 is ready to take a picture and when the main circuit is closed by the switch S, the motor circuit, including the conductors 33 and 34, as shown in Fig. 10, will remain open until the push button switch P is depressed to close said circuit. Upon closing the push button switch P, the motor M operates to rotate the cam so that the spring contact arm 35 of the circuit closer O, now resting against the low point or recess 36 of the cam, will be engaged by the high point of the cam and thereby moved into and maintained in engagement with fixed contact member 38, whereby to close the motor circuit, through conductors 39 and 40. Thus the circuit closer O is operated upon the momentary closing of the motor circuit with the push button P, and upon release of the push button, the motor circuit is maintained closed until the cam has made one revolution, at which time the spring contact arm 35 will move into the cam recess 36 and thereby break the circuit for the motor.

During the first quarter turn of the cam from the starting position shown in Fig. 1, the means K is operated to make a photograph on the strip F of sensitized paper then located in the chamber H, substantially at the same time that the shutter D opens and a photograph is made in chamber J on the strip of sensitized paper F.

When the shutter shaft 15 is rotated during said first quarter turn of the cam 21, an arm 41 on said shaft operates to move the leaf spring contact member 42 of circuit closers Q and Q' into engagement with a fixed contact member 43. The contact member 42 has a pair of contact points 44 thereon adapted to engage contact points 45 and 46. When contact points 44 engage contact points 45 and 46, a circuit for the lamps I of light means B is established by conductors 47 and 48 connected with conductor 4 so as to short out the resistance R, whereas a circuit for the light K' of the means K is also established by conductors 49 and 50. Thus it is seen that the lights I and K' are operated when the shutter D is opened, inasmuch as the shutter D and arm 41 for actuating the circuit closers Q and Q' are set whereby during the first quarter turn of the cam 21 from its starting position shown in Fig. 1, the arm 41 will actuate said circuit closer at the same time the notch 14 of the shutter registers with the lens C.

When the lamp K' of the photographing means K is energized, the light rays therefrom will illuminate the subject of photography shown at 52. This subject is a photographic negative containing the matter to be recorded on the strip F' of sensitized paper in the chamber H. As here shown, this negative picture is supported at its ends in clips 53 arranged on opposite sides of an opening 54 in the horizontal partition 55 whereby the light from the lamp K' will effectively illuminate the negative and the lens 56 supported by a similar partition 57 will direct the image of the negative onto the strip F' at the lower end of the chamber H. It will be noted that the subject negative 52 has a portion 58, say at one corner, treated so as to be opaque either by "blacking out" or placing an opaque sheet over such portion of the negative. This will cause a corresponding portion of the strip F to be protected against exposure, since the lens 56 will direct onto the strip F' only the subject appearing on the transparent or translucent portion of the negative and the opaque portion will prevent light rays from reaching said corresponding portion of said strip.

For making license cards, identification cards, or instruments, documents, or the like, photographically, I employ a negative subject containing, for example, the photograph record of lines and captions and stationary data suitable to the particular document or card desired. However, any negative subject may be used for purposes of making a composite finished product.

It is now seen that when preparing the apparatus for use, the first strip F of sensitized paper fed into chamber is not ready for use since it has been advanced through chamber H before the photographic means K has been operated. Consequently, when this first strip F is advanced by the second feeding operation, it is cut off with the knife T and the strip then located in chamber J is the one which has previously been exposed in chamber H, and the apparatus is then ready to make the first composite picture. Upon this first complete operation of the apparatus, and with every subsequent operation, two exposures take place approximately at the same time in the chambers H and J, the strip F'' in chamber H receiving the negative—subject image —while the strip F photographically records the particular subject to be photographed with the lens C, such as a particular person to whom the card or object being made is to be identified. In this the photographic product of this invention is progressively made in two steps, and it is apparent that the apparatus may be operated with rapidity to turn out a comparatively large number of such products in a short time.

The switch S has its operating lever 60 bifurcated at its outer end 60' and engaged with a vertically reciprocally mounted operating rod 61 between abutments 62 on the latter. This rod has its upper end disposed above the housing and provided with a button or finger piece which facilitates the depressing and the lifting of the rod. At its lower end, the rod 61 is pivoted to the knife J, as shown in Fig. 4. To close the switch, the rod 61 is lifted and the operating member is raised and, by spring tension provided by the switch, is maintained in said raised position, and likewise holds the rod and said knife in raised position. Therefore, when the rod 61 is depressed, the switch S is opened and the knife is operated to cut off the end of the strip of sensitized paper projecting beyond said knife. The piece thus cut off is the finished product of the apparatus and drops into the container, which is provided with a sliding closure 67 to render it light proof and is removable through an opening in the rear wall 69 of said housing. This container facilitates the removing of the exposed pictures to a dark room for developing.

It will be noted that the push button P is exposed through an opening 70 in the back wall of the housing whereby, when the operator, through use of the finder 71, likewise available through an opening in said wall, has the subject of photography in the proper position said button may be readily manipulated.

With the apparatus in the condition shown in Fig. 1 and assuming that the portion F of the sensitized paper strip in chamber J has previously been photographed in chamber H to record thereon the subject or matter which is to be a part of the finished composite photograph, the operator prepares the apparatus for use by lifting the rod 61 and thereby closing the switch S whereby to energize the lights 1 of the lighting means B, current flowing from the source not shown through conductors 4 and 5 to said lights. This completes the circuit, including the lights, resistance R and switch and the lights, though energized, are not operated at their maximum intensity, due to the resistance element R.

When the subject of photography, for example, a person for whom a driver's license card, or the like, is to be prepared, is in the proper position, as may be determined by the finder 71, the operator presses the push button switch to close the circuit for the motor M through conductors 4, 4', 5 and 5', and the motor in its first movement causes the cam 21 to rotate in a counterclockwise direction from the position shown in Fig. 1 whereby the switch O will be closed by said cam and, through conductors 4, 5, 39 and 40, will establish the motor circuit and maintain it closed during one complete revolution of the cam. During the first quarter movement of the cam, the chain and sprocket drive means operate the shutter shaft 15 and move the shutter from its Fig. 1 position so that the notch 14 will align with the lens C and permit the image to be received by the mirror E and reflected thereby onto the strip F in positive form, and appearing exactly on the subject, due to the reversing action of said mirror. Simultaneously with this operation, in fact upon initial movement of said shaft 15, the arm 41 thereon engages and closes circuit closers Q and Q', thereby causing the lights 1 and K to fully energize. The circuit closer Q shorts out the resistance R and closes circuit for the lamps 1 through conductors 4, 5, 47 and 48, whereas the circuit closer Q', through conductors 4, 5, 49 and 50, closes the circuit for light K. These lights 1 are thus fully energized when the shutter D is opened, whereby the necessary illumination of the subject of photography will be assured. Inasmuch as the subject-negative 52 is at all times in proper position for being photographed, it is only necessary to produce the illumination to effect the photography of said negative image on the strip F in chamber H. While, as here provided, the two subjects are simultaneously photographed in chambers H and J, it is obvious that I may use either chamber, exclusive of the other. The lens C would be suitably capped to render the equipment for chamber J in operation, whereas by removing the light K, or rendering the switch Q' inoperative, the means K would be inoperative.

The paper feed means H may be caused to operate at any time after the two aforementioned photographing operations have been completed, but, as here shown, the operation of said feed means will not take place until the cam 21 has completed about one-half of one revolution from the position shown in Fig. 1, due to the location of the pins or abutments 26. These abutments, in engaging the star wheel 29 and as hereinbefore described, effect operation of the rollers 27 and 28 to feed the strip of sensitized paper through the chambers H and J to the extent that the completed strip F will be projected past the knife T, the strip F' will be positioned in the chamber J ready to have the other subject photographed thereon, and an unexposed portion will be positioned in the chamber H. When the last pin 26 disengages from the star wheel 29, the switch member 35 snaps into the cam recess 36 and thereby opens the switch O and shuts off the motor M, the parts then assuming the Fig. 1 position ready for another operation.

It will now be seen that with each revolution of the cam 21 the apparatus operates to make two photographic records on the two portions or strips of the sensitized paper, and also positions said paper for a subsequent operation. It is seen that while the means K is operated to prepare the strip F', such as recording thereon of lines, etc., or any other subject of photography, the other photographing means in chamber J is also operated to complete the photographic operation on the strip or portion previously photographed in chamber H.

I claim:

1. A photographic camera comprising a housing, a photographing chamber therein, a lens for exposing the image within said chamber, a shutter controlling said lens, means providing for introduction of a piece of photographically sensitized material into said chamber and means cooperating with said lens for reversing the image and reflecting same onto said sensitized material, another chamber adjacent to the first chamber and from which said sensitized material is introduced into the first chamber, a subject of photography in said last named chamber, and means for making a positive photograph of said subject on a portion only of sensitized material in said last named chamber.

2. A photographic camera comprising a housing, independent photographing chambers therein including a partition between said chambers having an opening therein, means for progressively advancing a strip of sensitized material into one chamber and from thence through said opening into the other chamber and means associated with said chambers for making independent and positive photographic records on the portions of the strip of sensitized material lying on opposite sides of said partition.

3. A photographic camera comprising independent photographing chambers, a partition separating said chambers and having an opening therein, means for advancing a strip of sensitized material into one chamber and from thence through said opening into the other of said chambers and photographing means associated with said chambers for making independent and positive photographic records on portions of said strips of sensitized material lying on opposite sides of said partition.

4. A photographic camera comprising independent photographing chambers, a partition separating said chambers and having an opening therein, means for advancing a strip of sensitized material into one chamber and from thence through said opening into the other of said chambers and photographing means associated with said chambers for simultaneously making positive and independent photographic records on portions of said strips of sensitized material lying on opposite sides of said partition.

5. A photographic camera comprising a housing, a pair of independent photographing chambers, means for progressively advancing a strip of sensitized material through said chambers, including a motor, intermittently operated feed means actuated by said motor, and means actuated by said motor while said feed means is at rest for making simultaneously independent positive photographic records on portions of said strips within said chambers.

6. A photographic camera comprising a housing, a photographing chamber in said housing, another chamber in said housing adapted to receive from the first chamber a strip of sensitized material which has been advanced through the first named chamber, separate means in said chambers for making positive photographic records on different portions of the sensitized material therein, means for advancing a strip of sensitized material through said chambers, including a motor and intermittently operated feed means, and means operated by said motor for simultaneously operating said photographing means in said chambers, when said feed means is at rest.

7. A camera comprising a housing, a chamber in said housing, an electric lamp in said chambers, means for holding a photographic negative in said chamber, a lens in said chamber for directing the image onto sensitized material, another chamber, a lens associated with the second chamber for directing the image of a subject of photography into said chamber, a shutter controlling the last named lens, means for advancing a strip of sensitized material through said chambers, including intermittently operated feed means and a motor, circuit closing means operated by said motor for closing a circuit for said lamp when the feed means is at rest, shutter operating means actuated by the motor to open said shutter when the motor is at rest, and manually operable means for controlling said motor.

8. In a camera, a housing, independent photographing chambers therein, means for advancing a strip of sensitized material progressively through said chambers, means in one chamber for making a positive photographic record on a given area of the strip of material therein, means in another chamber for making a positive photographic record on another part of said given area of the strip, means for intermittently operating said advancing means, and means automatically operating said photographing means in said chambers when said strip is at rest.

9. A camera, comprising a housing, photographing chambers therein, means for advancing through said chambers a strip of sensitized material, means in one chamber for making a photographic record of a negative on a portion only of the whole area of said strip which is disposed therein, and including illuminating means, means for holding a negative, and a lens for directing a positive image of said negative onto said strip, and means in another chamber for making a photograph on another portion of said whole area of said strip, including a lens, a shutter therefor and image reversing means.

10. In a camera, a housing, independent chambers therein, means for progressively advancing a strip of sensitized material through said chambers, including intermittently operating feed means, power operated means for driving said feed means, means in one of said chambers for making a positive photograph on a portion only of the whole area of said strip, which is disposed on said chamber, means actuated by said power operated means for actuating said photographing means in said chambers when the feed means is inoperative, means in the other chamber for making a positive photograph on another portion of said whole area, when the latter is disposed in the other chamber, whereby to produce a composite photograph, means actuated by said power operated means for controlling the operation of said photographing means in said second named chamber, and manually operable means for controlling said power operated means.

11. In a camera, a housing, independent chambers therein, a track common to and forming the bottom wall of said chambers, means for intermittently advancing on said track and through said chambers a strip of sensitized material, independent photographing means in said chambers, including a motor, manually operable means for starting said motor, means actuated by the motor upon said starting thereof to maintain the motor in operation for a predetermined period of time, and means operated by the motor for simultaneously actuating the photographing means in said chambers.

12. In a camera, a housing, independent chambers therein, a track common to and forming the bottom wall of said chambers, means for intermittently advancing on said track and through said chambers a strip of sensitized material, independent photographing means in said chambers, including a motor, manually operable means for starting said motor, means actuated by the motor upon said starting thereof to maintain the motor in operation for a predetermined period of time, means operated by the motor for simultaneously actuating the photographing means in said chambers, and a knife for severing from the strip of material the portion thereof which is extended from said chambers.

13. In a camera, a housing, photographic chambers therein, means for advancing through said chambers a strip of sensitized material, means contained wholly within one chamber for making a photographic record on a portion only of the whole area of said strip which is disposed therein and including a luminating means, a subject of photography and means directing a positive image of said subject onto said portion of said strip and means in another chamber for making a photograph on another portion of the whole area of the strip exposed therein, including a lens, a shutter therefor and image reversing means.

14. A camera comprising a housing, independent chambers therein, a track common to and forming the bottom wall of said chambers, means for intermittently advancing on said track and through said chambers a strip of sensitized material, independent photographing means in said chambers for producing positive photographic records on said strip, a motor for operating said intermittent advance means, manually operable means for starting said motor, means actuated by the motor to maintain the motor in operation for a predetermined period of time and then shut off said motor, and means operated by the motor for simultaneously actuating said independent photographing means.

SPENCER F. MONROE.